E. Brooks,
Oliver,

No. 2,956.    Patented Feb. 16, 1843.

UNITED STATES PATENT OFFICE.

EBENEZER BROOKS, OF RIDGEVILLE, VIRGINIA.

BLACKSMITH'S STRIKER FOR FORGING IRON, &c.

Specification of Letters Patent No. 2,956, dated February 16, 1843.

*To all whom it may concern:*

Be it known that I, EBENEZER BROOKS, of Ridgeville, in the county of Hampshire and State of Virginia, have invented a new and useful Improvement in Blacksmith's Strikers, which is described as follows, reference being had to the annexed drawings of the same, making part of this specification.

Figure 1:
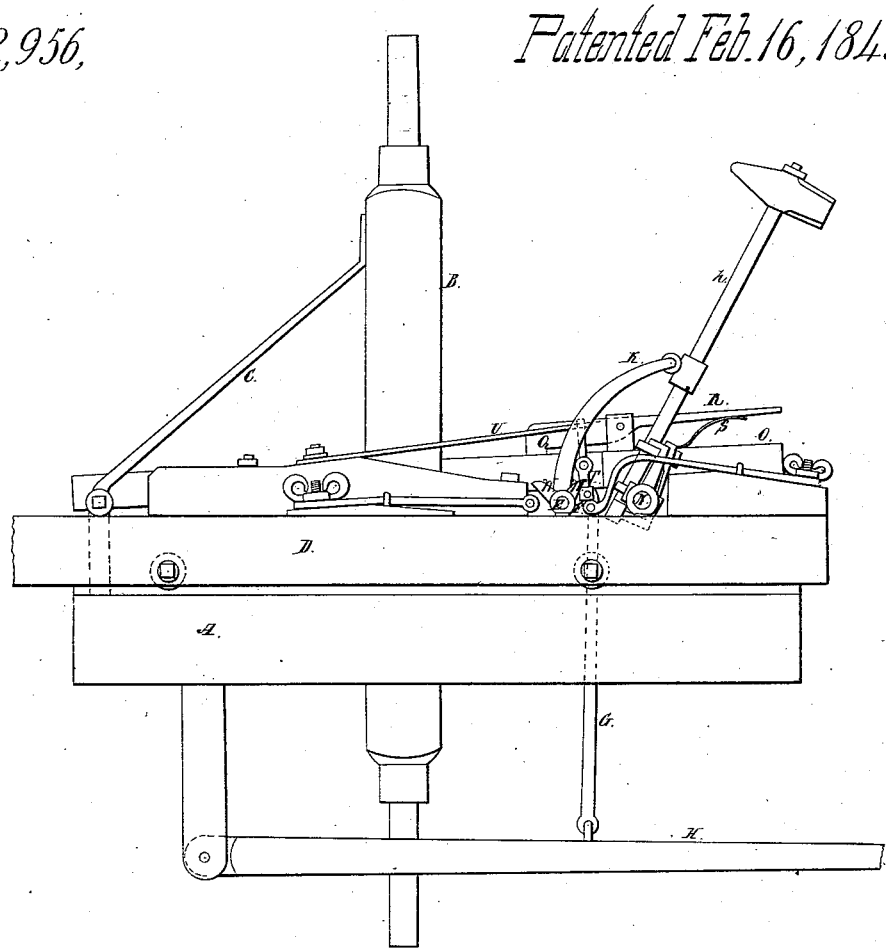
Figure 2:
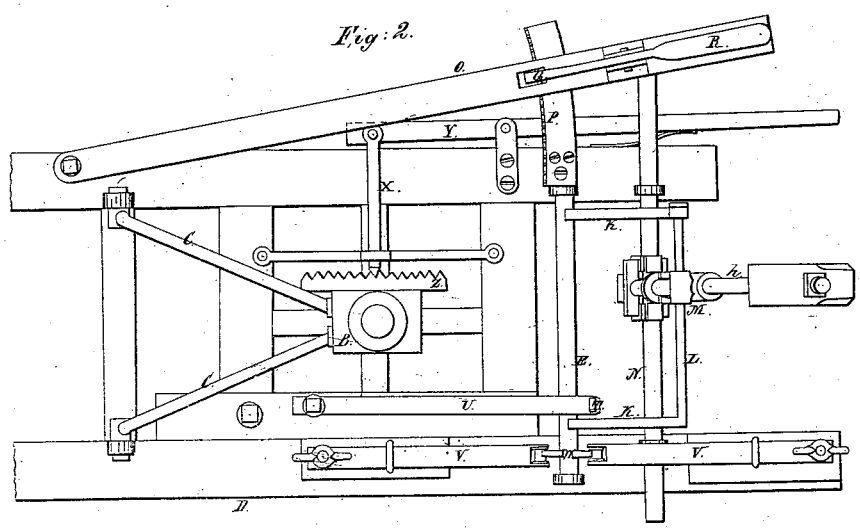

Figure 1 is a side elevation. Fig. 2 is a top view.

This machine consists of fixed parallel ways A A and a permanent post B in the center of the same braced to said ways by inclined braces C C. A rectangular carriage D having grooved rollers on the under side thereof moves over said ways back and forth for the purpose of bringing the striker toward or removing it from the anvil.

A horizontal transverse vibrating axle E is arranged in the aforesaid carriage turning in ears rising therefrom a short arm F projecting from said axle receives the upper end of a connecting rod G or strap leading down to a treadle H to which it is attached near the middle thereof by a hook and eye or otherwise, said treadle being below the ways having its short end moving on a pin passed through it and a hanging post into which it is inserted and its long end fitted for the foot of the blacksmith. Two arms K extend from said axle a sufficient distance having their outer extremities united by a round rod L on which slides transversely a thimble M having a perforated branch through which the handle *h* of the striker passes so that as the axle is vibrated said branch of the thimble will move freely over the handle of the striker and at the same time act upon it in bringing it down on the iron to be hammered while the thimble at the same time sliding over the aforesaid rod will allow the striker to have a transverse movement over the material to be hammered and the carriage moving over the ways will allow it to have a longitudinal movement over the same. The end of the handle of the striker is attached by a joint to another vibrating axle N lying parallel with that before described and turning in ears on the carriage in which ears it has also a transverse movement to the right or left for changing the position of the striker. This axle is attached to a lever O by which it is moved to the right or left said lever turning on a pin at one end and held by a segment notched plate P into which a dog Q attached to the end of a short handle R drops said handle being thrown up by a spring S attached to the lever.

The aforesaid arm of the first mentioned axle is attached by a stirrup or rod T to the end of a strong spring V fastened to the carriage for the purpose of throwing up the striker.

Two adjustable springs V V are secured to the side of the carriage one on one side of the axle and the other on the other or one before and the other behind it against which a double cam W fixed on the vibrating axle strikes for aiding in throwing the striker up and down the cam striking on rollers attached to the ends of the springs.

The carriage may be moved back and forth for the purpose of changing the position of the striker by hand or otherwise and is held in the position desired by a dog X attached to a spring lever Y operated by the blacksmith falling into notches in a plate Z fastened to the post.

I do not claim moving a blacksmith's striker by a treadle and spring but

What I do claim is—

The combination of the aforesaid branched thimble with rod and handle over which it moves as the striker moves and these thus combined I claim in combination with the carriage, ways, and levers for giving the striker a longitudinal as well as a transverse movement over the anvil during the operation of the striker by the action of the treadle and springs.

EBENEZER BROOKS.

Witnesses:
E. MAHER,
JOSHUA WOODWARD.